(12) United States Patent
McDonald

(10) Patent No.: US 7,178,010 B2
(45) Date of Patent: Feb. 13, 2007

(54) METHOD AND APPARATUS FOR CORRECTING AN INTERNAL CALL/RETURN STACK IN A MICROPROCESSOR THAT DETECTS FROM MULTIPLE PIPELINE STAGES INCORRECT SPECULATIVE UPDATE OF THE CALL/RETURN STACK

(75) Inventor: Thomas C. McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 454 days.

(21) Appl. No.: 10/643,338

(22) Filed: Aug. 19, 2003

(65) Prior Publication Data
US 2004/0143727 A1 Jul. 22, 2004

Related U.S. Application Data

(60) Provisional application No. 60/440,769, filed on Jan. 16, 2003.

(51) Int. Cl.
G06F 9/30 (2006.01)
G06F 9/40 (2006.01)
G06F 15/00 (2006.01)

(52) U.S. Cl. ..................................... 712/225
(58) Field of Classification Search ................. 712/225
See application file for complete search history.

(56) References Cited

U.S. PATENT DOCUMENTS

| | | | |
|---|---|---|---|
| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |
| 5,163,140 A | 11/1992 | Stiles et al. |
| 5,313,634 A | 5/1994 | Eickemeyer |
| 5,353,421 A | 10/1994 | Emma et al. |
| 5,355,459 A | 10/1994 | Matsuo et al. |
| 5,394,530 A | 2/1995 | Kitta |
| 5,404,467 A | 4/1995 | Saba et al. |
| 5,434,985 A | 7/1995 | Emma et al. |
| 5,513,330 A | 4/1996 | Stiles |

(Continued)

OTHER PUBLICATIONS

Computer Organization and Design by Patterson and Hennessy.*

(Continued)

*Primary Examiner*—Eddie Chan
*Assistant Examiner*—Brian Johnson
(74) *Attorney, Agent, or Firm*—E. Alan Davis; James W. Huffman

(57) ABSTRACT

An internal call/return stack (CRS) correction apparatus in a pipelined microprocessor is disclosed. Each time the microprocessor updates the CRS in response to a call or return instruction (call/ret), the microprocessor also stores correction information into a first correction stack. The microprocessor includes two distinct stages that detect invalidating events, such as a branch misprediction or exception. Once a call/ret passes the first detecting stage, the correction information associated with that call/ret is moved from the first correction stack to a second correction stack. If an invalidating event is detected at the upper detecting stage, then only the correction information in the first stack is used to correct the CRS. However, if an invalidating event is detected at the lower detecting stage, then the correction information in both the first and second stack is used to correct the CRS.

75 Claims, 5 Drawing Sheets

U.S. PATENT DOCUMENTS

| | | | |
|---|---|---|---|
| 5,530,825 | A | 6/1996 | Black et al. |
| 5,553,246 | A | 9/1996 | Suzuki |
| 5,604,877 | A | 2/1997 | Hoyt et al. |
| 5,623,614 | A | 4/1997 | Van Dyke et al. |
| 5,623,615 | A | 4/1997 | Salem et al. |
| 5,634,103 | A | 5/1997 | Dietz et al. |
| 5,687,349 | A | 11/1997 | McGarity |
| 5,687,360 | A | 11/1997 | Chang |
| 5,706,491 | A | 1/1998 | McMahan |
| 5,721,855 | A | 2/1998 | Hinton et al. |
| 5,734,881 | A | 3/1998 | White et al. |
| 5,752,069 | A | 5/1998 | Roberts et al. |
| 5,761,723 | A | 6/1998 | Black et al. |
| 5,768,576 | A | 6/1998 | Hoyt et al. |
| 5,805,877 | A | 9/1998 | Black et al. |
| 5,812,839 | A | 9/1998 | Hoyt et al. |
| 5,828,901 | A | 10/1998 | O'Toole et al. |
| 5,832,289 | A | 11/1998 | Shaw et al. |
| 5,850,532 | A | 12/1998 | Narayan et al. |
| 5,850,543 | A | 12/1998 | Shiell et al. |
| 5,864,707 | A | 1/1999 | Tran et al. |
| 5,867,701 | A | 2/1999 | Brown et al. |
| 5,881,260 | A | 3/1999 | Raje et al. |
| 5,881,265 | A | 3/1999 | McFarland et al. |
| 5,931,944 | A | 8/1999 | Ginosar et al. |
| 5,948,100 | A | 9/1999 | Hsu et al. |
| 5,961,629 | A | 10/1999 | Nguyen et al. |
| 5,964,868 | A | 10/1999 | Gochman et al. |
| 5,968,169 | A | 10/1999 | Pickett |
| 5,974,543 | A | 10/1999 | Hilgendorf et al. |
| 5,978,909 | A | 11/1999 | Lempel |
| 6,035,391 | A | 3/2000 | Isaman |
| 6,041,405 | A | 3/2000 | Green |
| 6,044,459 | A | 3/2000 | Bae et al. |
| 6,081,884 | A | 6/2000 | Miller |
| 6,085,311 | A | 7/2000 | Narayan et al. |
| 6,088,793 | A | 7/2000 | Liu et al. |
| 6,101,595 | A | 8/2000 | Pickett et al. |
| 6,108,773 | A | 8/2000 | Col et al. |
| 6,122,729 | A | 9/2000 | Tran |
| 6,134,654 | A | 10/2000 | Patel et al. |
| 6,151,671 | A | 11/2000 | D'Sa et al. |
| 6,157,988 | A | 12/2000 | Dowling |
| 6,170,054 | B1 | 1/2001 | Poplingher |
| 6,175,897 | B1 | 1/2001 | Ryan et al. |
| 6,185,676 | B1 | 2/2001 | Poplingher et al. |
| 6,233,676 | B1 | 5/2001 | Henry et al. |
| 6,250,821 | B1 | 6/2001 | Schwendinger |
| 6,256,727 | B1 | 7/2001 | McDonald |
| 6,260,138 | B1 | 7/2001 | Harris |
| 6,279,105 | B1 | 8/2001 | Konigsburg et al. |
| 6,279,106 | B1 | 8/2001 | Roberts |
| 6,308,259 | B1 | 10/2001 | Witt |
| 6,314,514 | B1 | 11/2001 | McDonald |
| 6,321,321 | B1 | 11/2001 | Johnson |
| 6,351,796 | B1 | 2/2002 | McCormick, Jr. et al. |
| 6,374,350 | B1 * | 4/2002 | D'Sa et al. ............... 712/239 |
| 6,457,120 | B1 | 9/2002 | Sinharoy |
| 6,502,185 | B1 | 12/2002 | Keller et al. |
| 6,560,696 | B1 | 5/2003 | Hummel et al. |
| 6,601,161 | B2 | 7/2003 | Rappoport et al. |
| 6,647,467 | B1 | 11/2003 | Dowling |
| 6,725,357 | B1 | 4/2004 | Cousin |
| 6,748,441 | B1 | 6/2004 | Gemmell |
| 6,754,808 | B1 | 6/2004 | Roth et al. |
| 6,823,444 | B1 | 11/2004 | Henry et al. |
| 6,886,093 | B2 | 4/2005 | Henry |
| 6,895,498 | B2 | 5/2005 | McDonald et al. |
| 6,898,699 | B2 | 5/2005 | Jourdan et al. |
| 6,968,444 | B1 | 11/2005 | Kroesche et al. |
| 2002/0188833 | A1 | 12/2002 | Henry et al. |
| 2002/0194460 | A1 | 12/2002 | Henry et al. |
| 2002/0194461 | A1 | 12/2002 | Henry et al. |
| 2002/0194464 | A1 | 12/2002 | Henry et al. |
| 2004/0030866 | A1 | 2/2004 | McDonald |
| 2004/0139281 | A1 | 7/2004 | McDonald |
| 2004/0139292 | A1 | 7/2004 | McDonald |
| 2004/0139301 | A1 | 7/2004 | McDonald |
| 2004/0143709 | A1 | 7/2004 | McDonald |
| 2004/0143727 | A1 | 7/2004 | McDonald |
| 2005/0044343 | A1 | 2/2005 | Henry et al. |
| 2005/0076193 | A1 | 4/2005 | Henry et al. |
| 2005/0114636 | A1 | 5/2005 | McDonald et al. |
| 2005/0132175 | A1 | 6/2005 | Henry et al. |
| 2005/0198479 | A1 | 9/2005 | Bean et al. |
| 2005/0198481 | A1 | 9/2005 | Henry et al. |

OTHER PUBLICATIONS

*Microporcessor Report*. vol. 9. No. 2. Feb. 16, 1995. p. 5.
*Microprocessor Report*. Aug. 23, 1999. p. 7.
Yeh et al. *Alternative Implementation of Two-Level Adaptive Branch Prediciton*, 19th Annual International Symposium on Computer Architecture. pp. 124-134. May 19-21, 1992. Gold Coast, Australia.
Chang et al. *Alternative Implementations of Hybrid Branch Predictors*. Proceedings of MICRO-28, 1995. IEEE.
Mc Farling, Scott. *WRL Technical Note TN-36*. Combining Branch Predictors. Jun. 1993. Western Research Laboratory, 250 University Ave., Palo Alto, CA 94301.
Bray et al. *Strategies For Branch Target Buffers*. Technical Report No. CSL-TR-91-480. Jun. 1991.
Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.
IEEE 100, The Authoritative Dictionary of IEEE Standard Terms, Seventh Edition. The Institute of Electrical Engineering, Inc. New York: Standards Information Network IEEE Press p. 135.
Online Computing Dictionary. http://Instantweb.com/d/dictionary/foldoc.cgi?query=btb May 5, 1995. Branch Target Buffer The D Latch, Play-Hookey Web Page, Oct. 10, 1999.
Jimenez et al. "The Impact of Delay on the Design of Branch Predictors." 2000.
Eberly et al. "The Correlation Branch Target Address Cache" May 1996.
Patterson et al. "Computer Organization & Design: The Hardware/Software Interface." Morgan Kaufmann Publishers, Inc. San Francisco, CA. 1998 p. 453-455.
IBM Technical Disclosure Bulletin NN9204269, "Return Address Stack Cache." Apr. 1992, pp. 269-271.

* cited by examiner

METHOD AND APPARATUS FOR CORRECTING AN INTERNAL CALL/RETURN STACK IN A MICROPROCESSOR THAT DETECTS FROM MULTIPLE PIPELINE STAGES INCORRECT SPECULATIVE UPDATE OF THE CALL/RETURN STACK

PRIORITY INFORMATION

This application claims priority based on U.S. Provisional Application Ser. No. 60/440,769, filed Jan. 16, 2003, entitled APPARATUS AND METHOD FOR CORRECTING AN INTERNAL CALL/RETURN STACK IN A MICROPROCESSOR THAT DETECTS BRANCH INSTRUCTION MISPREDICTIONS FROM MULTIPLE PIPELINE STAGES.

FIELD OF THE INVENTION

This invention relates in general to the field of call/return stacks in microprocessors and particularly to maintaining consistency of a call/return stack with main memory.

BACKGROUND OF THE INVENTION

A microprocessor is a digital device that executes instructions specified by a computer program. Modern microprocessors employ an internal call/return stack to reduce pipeline bubbles introduced by lengthy memory accesses associated with call and return instructions.

A call instruction comprises an instruction that changes the flow of a program to a subroutine, whose address is specified in the call instruction. When a call instruction is executed, the return address, i.e., the address of the instruction after the call instruction, is pushed onto a stack in main memory pointed to by a stack pointer register in the microprocessor, and the address of the subroutine is loaded into the instruction pointer register of the microprocessor. A return instruction comprises an instruction that changes the flow of a program from the subroutine back to the instruction following the call instruction in the program. When a return instruction is executed, the return address previously pushed onto the stack is popped from the main memory stack and loaded into the instruction pointer register.

In a microprocessor that incorporates a call/return stack, when a call instruction executes, the return address is pushed onto the call/return stack to enable instruction fetching to continue, and later stages of the pipeline subsequently update the main memory stack with the return address. Conversely, when a return instruction executes, the return address is popped from the call/return stack to enable instruction fetching to continue, without having to wait for the relatively lengthy retrieval of the return address from the main memory stack.

The effectiveness of a call/return stack is largely determined by the ability of the processor to keep the call/return stack consistent with main memory. Inconsistencies between the main memory and the call/return stack may be introduced by speculative updates of the call/return stack in response to call or return instructions. An update of the call/return stack may be speculative because an instruction ahead of the call/return in the pipeline causes an invalidating event, such as generating an exception, for example, which requires the pipeline to flush all the instructions behind the exception-causing instruction, including speculatively executed call/return instructions. Similarly, a branch instruction executing ahead of call/return instructions may have been mispredicted, which might require the pipeline to flush the speculatively executed call/return instructions. Because the call/return stack has been speculatively updated in response to the call/return instructions, but the main memory stack has not yet been updated until the call/return instructions are no longer speculative, the contents of the call/return stack and the contents of the main memory stack are inconsistent.

U.S. Pat. No. 6,314,514, entitled METHOD AND APPARATUS FOR CORRECTING AN INTERNAL CALL/RETURN STACK IN A MICROPROCESSOR THAT SPECULATIVELY EXECUTES CALL AND RETURN INSTRUCTIONS, which is incorporated by reference herein, describes a method and apparatus for keeping a call/return stack consistent with main memory in spite of speculative call/return instruction executions. However, the apparatus described in the Patent operates in a microprocessor in which a branch instruction misprediction is detected from only a single stage in the microprocessor pipeline, and will not operate effectively in a microprocessor that takes exceptions or detects branch instruction mispredictions from multiple stages of the pipeline.

Therefore, what is needed is a method and apparatus for correcting an internal call/return stack in a microprocessor that detects incorrect speculative execution of call/return instructions from multiple pipeline stages.

SUMMARY OF THE INVENTION

The present invention provides a segmented correction apparatus that keeps the correction information for a speculative call/return instruction in different segments depending upon the location of the call/return within the pipeline, thereby enabling selective correction based on the stage in which the call/return instruction resides at the time of the detection of the invalidating event relative to the stage that detects the invalidating event. In one aspect the present invention provides an apparatus for correcting a call/return stack in a pipelined microprocessor. The apparatus includes a first stack, having a first plurality of entries for storing correction information related to call or return instructions present in a first plurality of stages of the microprocessor pipeline. The apparatus also includes a second stack, coupled to the first stack, having a second plurality of entries for storing correction information related to call or return instructions present in a second plurality of stages of the microprocessor pipeline. The apparatus also includes control logic, coupled to the first and second stacks, for receiving a first control signal indicating a call or return instruction is passing from the first plurality of stages to the second plurality of stages. The control logic moves the correction information associated with the call or return instruction from the first stack to the second stack in response to the first control signal. The apparatus also includes a second control signal, received by the control logic, for indicating the call or return instructions present in the first plurality of pipeline stages were speculatively incorrectly executed. The control logic corrects the call/return stack using the correction information stored in the first plurality of entries of the first stack, in response to the second control signal. The apparatus also includes a third control signal, received by the control logic, for indicating the call or return instructions present in the first and second plurality of pipeline stages were speculatively incorrectly executed. The third control signal indicates an instruction preceding the call or return instructions present in the first and second plurality of pipeline stages generated a microprocessor exception.

In another aspect, the present invention provides a method for maintaining consistency between a call/return stack (CRS) in a pipelined microprocessor and a memory coupled thereto. The method includes receiving requests to update the CRS in response to a presence of call or return instructions. The method also includes storing correction information into a first buffer, in response to the receiving. The method also includes detecting a condition in which one of the call or return instructions has proceeded past a first stage of the microprocessor pipeline configured to detect a branch instruction misprediction, after the storing. The method also includes moving a portion of the correction information from the first buffer to a second buffer, in response to the detecting. The invalidating event comprises an exception. The method further includes correcting the CRS with the correction information stored in the first buffer if the first stage detects the invalidating event and correcting the CRS with the correction information stored in the first and second buffer if a second stage of the microprocessor pipeline detects a second invalidating event. The second stage is below the first stage.

In another aspect, the present invention provides a computer program product for use with a computing device, the computer program product having a computer usable storage medium having computer-readable program code embodied in the medium for providing an apparatus for correcting a call/return stack in a pipelined microprocessor. The program code includes first program code for providing a first stack having a first plurality of entries for storing correction information related to call or return instructions present in a first plurality of stages of the microprocessor pipeline. The program code also includes second program code for providing a second stack, coupled to the first stack, having a second plurality of entries for storing correction information related to call or return instructions present in a second plurality of stages of the microprocessor pipeline. The program code also includes third program code for providing control logic, coupled to the first and second stacks, for receiving a first control signal indicating a call or return instruction is passing from the first plurality of stages to the second plurality of stages. The control logic moves the correction information associated with the call or return instruction from the first stack to the second stack in response to the first control signal. The program code also includes fourth program code for providing a second control signal, received by the control logic, for indicating the call or return instructions present in the first plurality of pipeline stages were speculatively incorrectly executed. The control logic corrects the call/return stack using the correction information stored in the first plurality of entries of the first stack, in response to the second control signal. The program code also includes fifth program code for providing a third control signal, received by the control logic, for indicating the call or return instructions present in the first and second plurality of pipeline stages were speculatively incorrectly executed. The third control signal indicates an instruction preceding the call or return instructions present in the first and second plurality of pipeline stages generated a microprocessor exception.

In another aspect, the present invention provides an apparatus for correcting a call/return stack in a pipelined microprocessor. The apparatus includes a first stack comprising a first plurality of entries for storing correction information related to call or return instructions present in a first plurality of stages of the microprocessor pipeline. The apparatus also includes a second stack, coupled to the first stack, comprising a second plurality of entries for storing correction information related to call or return instructions present in a second plurality of stages of the microprocessor pipeline. The apparatus also includes control logic, coupled to the first and second stacks, for receiving a first control signal indicating a call or return instruction is passing from the first plurality of stages to the second plurality of stages. The control logic moves the correction information associated with the call or return instruction from the first stack to the second stack in response to the first control signal. The apparatus also includes a second control signal, received by the control logic, for indicating the call or return instructions present in the first plurality of pipeline stages were speculatively incorrectly executed. The control logic corrects the call/return stack using the correction information stored in the first plurality of entries of the first stack, in response to the second control signal. The apparatus also includes a third control signal, received by the control logic, for indicating the call or return instructions present in the first and second plurality of pipeline stages were speculatively incorrectly executed. The control logic corrects the call/return stack using the correction information stored in the first and second plurality of entries of the first and second stacks, in response to the third control signal. For each valid one of the first plurality of entries, the control logic pops the top valid one of the first plurality of entries from the first stack, and corrects the call/return stack based on the correction information stored therein, then for each valid one of the second plurality of entries, the control logic pops the top valid one of the second plurality of entries from the second stack.

An advantage of the present invention is that it enables invalidating events, such as detection of a branch instruction misprediction or exception, to be detected at multiple stages of the microprocessor pipeline while still enjoying the advantages of a call/return stack that remains consistent with main memory. It is advantageous to detect branch instruction mispredictions early in the pipeline, rather than only near the bottom of the pipeline, because it reduces pipeline bubbles by enabling correction of the misprediction and fetching of the correct instructions sooner than would be possible if the misprediction were detected only near the bottom of the pipeline.

Other features and advantages of the present invention will become apparent upon study of the remaining portions of the specification and drawings.

DETAILED DESCRIPTION

Figure 1:
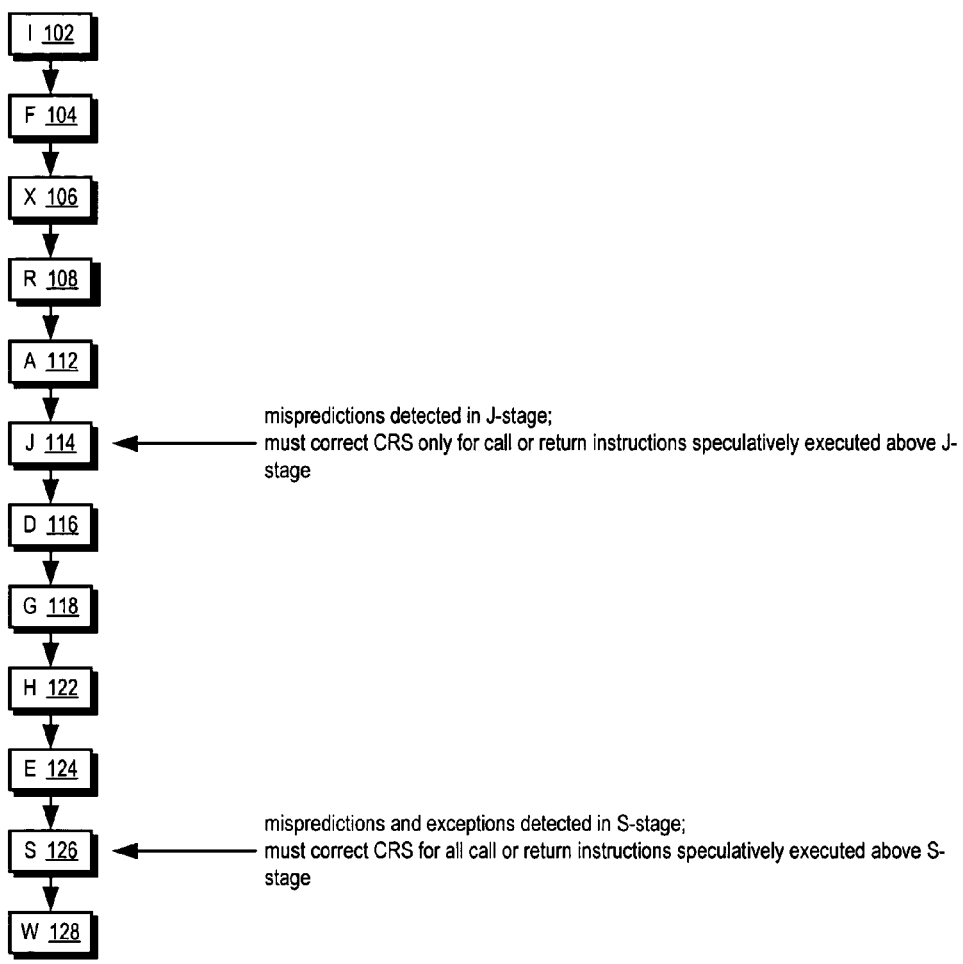
FIG. 1 is a block diagram of a pipelined microprocessor according to the present invention.

Referring now to FIG. 1, a block diagram of a pipelined microprocessor 100 according to the present invention is shown. In one embodiment, processor pipeline 100 includes twelve stages, as shown in FIG. 1.

Microprocessor 100 includes an I-stage 102, or instruction fetch stage. I-stage 102 provides a fetch address to an instruction cache in order to fetch instructions for microprocessor 100 to execute. If the fetch address is missing in the instruction cache, I-stage 102 fetches the missing cache line from a main memory coupled to microprocessor 100. In one embodiment, I-stage 102 includes a branch target address cache that is accessed in parallel with an instruction cache in I-stage 102 using the instruction cache fetch address. The branch target address cache caches target addresses of previously executed branch instructions and stores prediction information about the outcome of a branch instruction, i.e., whether the branch instruction will be taken or not taken. The branch target address cache generates a prediction of the outcome and target address of a branch instruction in response to the instruction cache fetch address. Branch instructions are well known in the art of microprocessors, and comprise instructions that change the flow of a program. In particular, a branch instruction alters the value of an instruction pointer register or program counter register, such as instruction pointer (IP) register 214 of FIG. 2, which specifies the memory address of the next instruction to be executed. In one embodiment, I-stage 102 comprises multiple stages.

Microprocessor 100 also includes an F-stage 104, or instruction format stage 104, coupled to I-stage 102. F-stage 104 includes instruction decode and format logic for decoding and formatting instructions. In one embodiment, microprocessor 100 is an x86 processor, which allows for variable length instructions in its instruction set. F-stage 104 receives a stream of instruction bytes from the instruction cache and parses the stream into discrete groups of bytes constituting an x86 instruction along with the length of each instruction. In particular, the decode logic of F-stage 104 decodes call and return instructions and causes a call/return stack (CRS) 206 of microprocessor 100 of FIG. 2 to be updated in response to a decoded call/return instruction. CRS 206 and F-stage 104 are described in more detail below with respect to FIG. 2.

Microprocessor 100 also includes an X-stage 106, or translation stage 106, coupled to F-stage 104. X-stage 106 includes an instruction translator that translates x86 macroinstructions into microinstructions that are executable by the remainder of the pipeline stages.

Microprocessor 100 also includes an R-stage 108, or register stage 108, coupled to X-stage 106. R-stage 108 includes a user-visible register set, in addition to other non-user-visible registers. Instruction operands for the translated microinstructions are stored in R-stage 108 registers for execution of the microinstructions by subsequent stages of the pipeline 100.

Microprocessor 100 also includes an A-stage 112, or address stage 112, coupled to R-stage 108. A-stage 112 includes address generation logic that receives operands and microinstructions from R-stage 108 and generates addresses required by the microinstructions, such as memory addresses for load/store microinstructions. In particular, A-stage 112 calculates branch instruction target addresses.

Microprocessor 100 also includes a J-stage 114, coupled to A-stage 112, that receives branch instruction target addresses calculated by A-stage 112. J-stage 114 detects branch instruction mispredictions. That is, J-stage 114 detects if a prediction previously made by an earlier pipeline 100 stage for a branch instruction was a misprediction, i.e., was incorrect by detecting a mismatch between the previously predicted target address and the target address calculated by A-stage 112. J-stage 114 is described in more detail below with respect to FIG. 2.

Microprocessor 100 also includes a D-stage 116, or data stage 116, coupled to J-stage 114. D-stage 116 includes logic for accessing data specified by the addresses generated by A-stage 112. D-stage 116 loads data from main memory into microprocessor 100. In particular, D-stage 116 loads return addresses from the main memory stack in response to a return instruction. The return address loaded from the main memory stack is compared with the return address previously popped from CRS 206 in response to a return instruction to verify that CRS 206 had the correct value. If the CRS 206 return address does not match the main memory stack return address, then the pipeline 100 is flushed and restarted using the main memory stack return address. D-stage 116 also includes a data cache for caching data within microprocessor 100 from main memory. In one embodiment, the data cache is a three-cycle cache. A G-stage 118 coupled to D-stage 116 is the second stage of the data cache access and an H-stage 122 coupled to G-stage 118 is the third stage of the data cache access.

Microprocessor 100 also includes an E-stage 124, or execution stage 124, coupled to H-stage 122. E-stage 124 includes execution logic, such as arithmetic logic units, for executing the microinstructions based on the data and operands provided from previous stages. In particular, E-stage 124 produces a resolved target address and outcome of all branch instructions. That is, the E-stage 124 target address is known to be the correct target address of all branch instructions with which all predicted target addresses must match. In addition, E-stage 124 produces a resolved outcome for all branch instructions, i.e., whether the branch is taken or not taken.

Microprocessor 100 also includes an S-stage 126, or store stage 126, coupled to E-stage 124. S-stage 126 performs a store to main memory of the results of the microinstruction execution received from E-stage 124. In addition, the target address and outcome of branch instructions calculated in E-stage 124 are provided to S-stage 126. Furthermore, the branch target address cache of I-stage 102 is updated from S-stage 126 with the resolved target address and outcome of a branch instruction. S-stage 126 detects if a prediction previously made by an earlier pipeline 100 stage for a branch instruction was a misprediction. Additionally, S-stage 126 detects whether an exception occurred. An exception comprises a condition that causes a change in normal program execution. An exception may be caused by a hardware or software event. Examples of exceptions include a hardware interrupt, a software interrupt, a non-maskable interrupt, an instruction trace execution, a breakpoint, an arithmetic overflow or underflow, a page fault, a misaligned memory access, a memory protection violation, an undefined instruction, a hardware malfunction, a power failure, a divide by zero, a segment limit error, a floating point error, a bad descriptor, and a device (such as a co-processor) not available. S-stage 126 is described in more detail below with respect to FIG. 2.

Microprocessor 100 also includes a W-stage 128, or write-back stage 128, coupled to S-stage 126. W-stage 128 writes back the result from S-stage 126 into R-stage 108 registers, thereby updating microprocessor 100 state.

As may be seen from FIG. 1, microprocessor 100 includes more than one stage in which invalidating events are detected, such as branch mispredictions or instruction exceptions, which require microprocessor 100 to correct for updates previously made to CRS 206 based on speculative executions of call/return instructions. This is in contrast to prior microprocessors incorporating a call/return stack and apparatus for correcting speculative updates to the call/return stack, which only detected invalidating events from one stage in the pipeline, as described in the above referenced U.S. Patent. Consequently, the correction apparatus described in FIG. 2 of the present invention corrects the CRS 206 only for call/return instructions present above or in J-stage 114 if an invalidating event is detected in J-stage 114; whereas the correction apparatus corrects the CRS 206 for call/return instructions present above or in S-stage 126 if the invalidating event is detected in S-stage 126.

Figure 2:
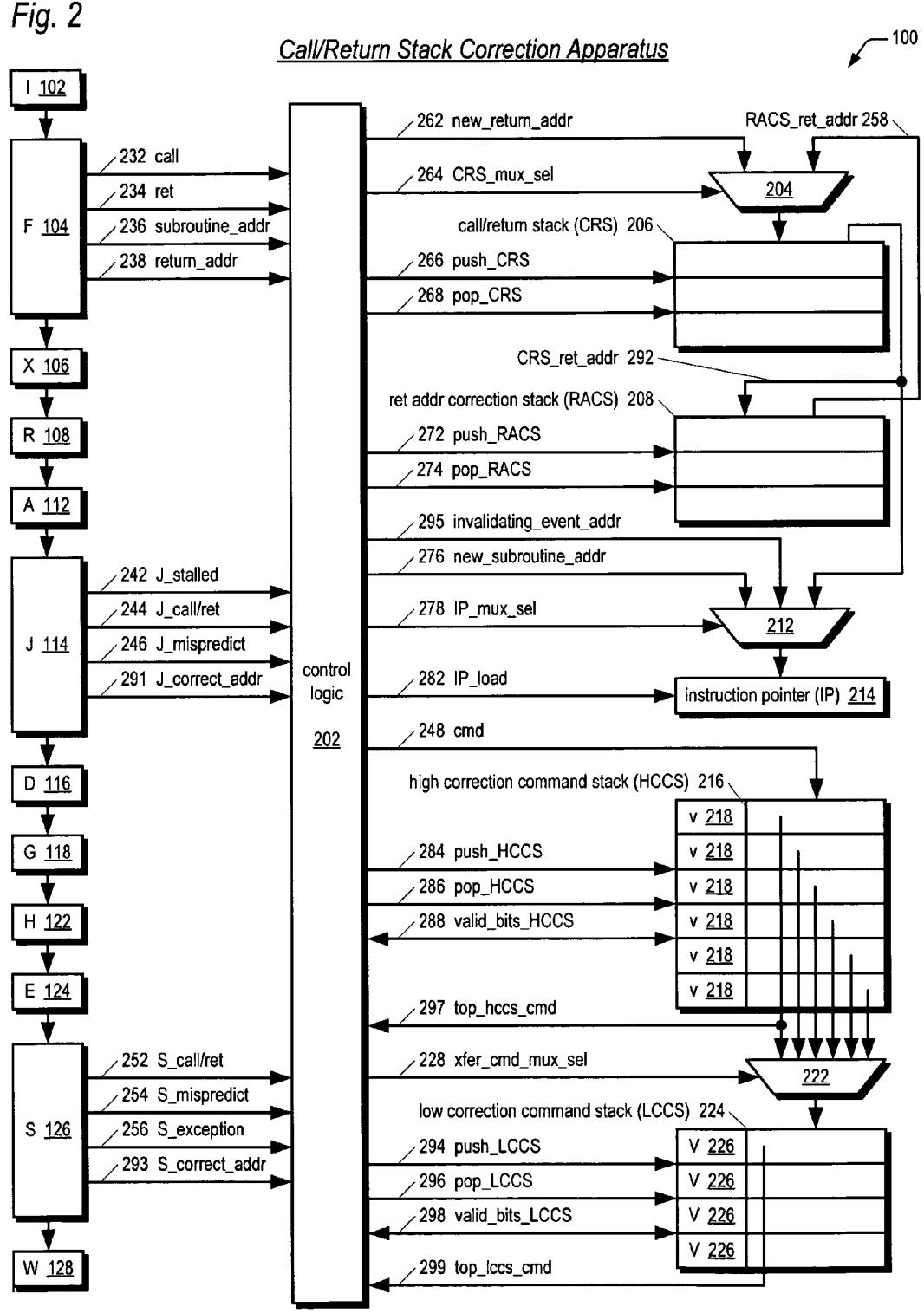
FIG. 2 is a block diagram of the microprocessor of FIG. 1 including a call/return stack correction apparatus according to the present invention.

Referring now to FIG. 2, a block diagram of microprocessor 100 of FIG. 1 including a call/return stack correction apparatus according to the present invention is shown. FIG. 2 shows pipeline stages 102 through 128 of FIG. 1. FIG. 2 also shows control logic 202, a two-input multiplexer 204 coupled to control logic 202, call/return stack (CRS) 206 coupled to multiplexer 204, a return address correction stack (RACS) 208 coupled to CRS 206, a three-input multiplexer 212 coupled to RACS 208, instruction pointer (IP) register 214 coupled to multiplexer 212, a high correction command stack (HCCS) 216 coupled to control logic 202, a six-input multiplexer 222 coupled to HCCS 216, and a low correction command stack (LCCS) 224 coupled to multiplexer 222, comprised in microprocessor 100.

F-stage 104 generates a true value on a call signal 232, provided to control logic 202, when a call instruction has been decoded. In one embodiment, a call instruction comprises an x86 architecture CALL instruction. Control logic 202 speculatively updates CRS 206 in response to call signal 232, as described below. In addition, F-stage 104 provides the address of the subroutine specified by the call instruction on a subroutine_addr signal 236, provided to control logic 202. Furthermore, F-stage 104 provides the return address of the call instruction on a return_addr signal 238, provided to control logic 202. Finally, F-stage 104 generates a true value on a return signal 234, provided to control logic 202, when a return instruction has been decoded. In one embodiment, a return instruction comprises an x86 architecture RET instruction. Control logic 202 speculatively updates CRS 206 in response to return signal 234, as described below.

J-stage 114 generates a true value on a J_call/ret signal 244, provided to control logic 202, when a call or return instruction reaches J-stage 114. In one embodiment, a status bit is generated by F-stage 104 to indicate an instruction is a call or return instruction, and the status bit is provided down the pipeline along with the instruction. J-stage 114 generates a true value on J_call/ret signal 244 if the status bit is true.

J-stage 114 also generates a true value on a J_stalled signal 242, provided to control logic 202, when J-stage 114 is stalled; otherwise, J-stage 114 generates a false value on J_stalled signal 242. A true value on J_stalled signal 242 indicates that the instruction currently present in J-stage 114 will not progress to the next stage, i.e., D-stage 116, during the next clock cycle, whereas a false value on J_stalled signal 242 indicates that the instruction currently present in J-stage 114 will progress to the next stage during the next clock cycle.

J-stage 114 also generates a true value on a J_mispredict signal 246 if a branch instruction reaches J-stage 114 and J-stage 114 detects that the branch instruction was previously mispredicted, which requires all the stages above J-stage 114 to be flushed and for microprocessor 100 to branch to the correct target of the branch instruction, i.e., to branch to the instruction following the branch instruction (if the branch was erroneously predicted taken), or to branch to the correct target address of the branch instruction (if the target address was correctly predicted taken but the predicted target address was incorrect). For branches that can be resolved in J-stage 114, J-stage 114 also calculates the correct target of the branch instruction and provides the correct address to control logic 202 on a J_correct_addr signal 291. The stages above and including J-stage 114 are referred to herein as the upper or high stages of pipeline 100. The stages below J-stage 114 are referred to as the lower or low stages of pipeline 100.

S-stage 126 generates a true value on an S_call/ret signal 252, provided to control logic 202, when a call or return instruction reaches S-stage 126. In one embodiment, S-stage 126 generates a true value on S_call/ret signal 252 if the status bit generated by F-stage 104 indicating the instruction is a call/return instruction is true.

S-stage 126 also generates a true value on an S_mispredict signal 254 if a branch instruction reaches S-stage 126 and S-stage 126 detects that the branch instruction was previously mispredicted, which requires all the stages above and including S-stage 126 to be flushed and for microprocessor 100 to branch to the correct target of the branch instruction. S-stage 126 also provides the correct target of the branch instruction to control logic 202 on a S_correct_addr signal 293.

S-stage 126 also generates a true value on an S_exception signal 256 if an instruction reaches S-stage 126 and S-stage 126 detects that the instruction generates an exception, which requires all the stages above and including S-stage 126 to be flushed and for microprocessor 100 to branch to an exception handling routine. In one embodiment, a branch instruction detected mispredicted by J-stage 114 or S-stage 126 or an instruction generating an exception condition in S-stage 126 may be a call/return instruction.

Multiplexer 204 receives on one input a new_return_addr signal 262 generated by control logic 202. When F-stage 104 generates a true value on call signal 232, control logic 202 forwards the return address received from F-stage 104 via return_addr signal 238 on to multiplexer 204 via new_return_addr signal 262. Multiplexer 204 receives on its second input a RACS_ret_addr signal 258 from RACS 208. RACS_ret_addr signal 258 is the value of the return address on the top entry of RACS 208, which is populated as described below. The output of multiplexer 204 is provided as the input to CRS 206. Control logic 202 generates a CRS_mux_sel signal 264 to control multiplexer 204. Control logic 202 generates a value on CRS_mux_sel signal 264 to cause multiplexer 204 to select new_return_addr signal 262 when F-stage 104 specifies the presence of a call instruction via call signal 232 in order to speculatively update CRS 206 with the call instruction return address, as described below. Control logic 202 generates a value on CRS_mux_sel signal 264 to cause multiplexer 204 to select RACS_ret_addr signal 258 in order to correct an incorrect previous speculative update of CRS 206 in response to an invalidating event, such as those indicated by J_mispredict signal 246, S_mispredict signal 254, or S_exception 256, as described below.

CRS 206 comprises an array of storage elements, or entries, for storing call instruction return addresses. In one embodiment, CRS 206 comprises sixteen entries for storing sixteen return addresses; however, for simplicity, CRS 206 is shown in FIG. 2 with only three entries. The entries of CRS 206 are arranged as a stack. Control logic 202 generates a true value on a push_CRS signal 266 to push a return address from multiplexer 204 onto CRS 206. When control logic 202 pushes a return address onto CRS 206, the return addresses currently in CRS 206 are pushed down one entry (the bottom entry is pushed out), and the return address provided by multiplexer 204 is loaded into the top entry of CRS 206. Control logic 202 also generates a true value on a pop_CRS signal 268 to pop a return address off CRS 206. When control logic 202 pops a return address off CRS 206, the return address currently in the top entry of CRS 206 is popped off and provided on a CRS_ret_addr signal 292, and the return addresses in the other entries of CRS 206 are all shifted up one entry. Operation of CRS 206 is described in more detail below.

RACS 208 comprises an array of storage elements, or entries, for storing call instruction return addresses. In one embodiment, RACS 208 comprises three entries for storing three return addresses. The entries of RACS 208 are arranged as a stack. Control logic 202 generates a true value on a push_RACS signal 272 to push a return address from CRS_ret_addr signal 292 onto RACS 208. When control logic 202 pushes a return address onto RACS 208, the return addresses currently in RACS 208 are pushed down one entry (the bottom entry is pushed out), and the return address provided on CRS_ret_addr signal 292 is loaded into the top entry of RACS 208. Control logic 202 also generates a true value on a pop_RACS signal 274 to pop a return address off RACS 208. When control logic 202 pops a return address off RACS 208, the return address currently in the top entry of RACS 208 is popped off and provided on RACS_ret_addr signal 258, and the return addresses in the other entries of RACS 208 are all shifted up one entry. Operation of RACS 208 is described in more detail below.

Multiplexer 212 receives on one input a new_subroutine_addr signal 276 generated by control logic 202. When F-stage 104 generates a true value on call signal 232, control logic 202 forwards the subroutine address received from F-stage 104 via subroutine_addr signal 236 on to multiplexer 212 via new_subroutine_addr signal 276. Multiplexer 212 receives on its second input CRS_ret_addr signal 292 from CRS 206. Multiplexer 212 receives on its third input an invalidating_event_addr signal 295 from control logic 202. The output of multiplexer 212 is provided as the input to instruction pointer register 214. Control logic 202 generates a true value on an IP_load signal 282 to cause the output of multiplexer 212 to be loaded into IP register 214. Control logic 202 generates an IP_mux_sel signal 278 to control multiplexer 212. Control logic 202 generates a value on IP_mux_sel signal 278 to cause multiplexer 212 to select new_subroutine_addr signal 276 when F-stage 104 specifies the presence of a call instruction via call signal 232 in order to cause microprocessor 100 to branch to the call instruction subroutine address, as described below with respect to FIG. 3. Control logic 202 generates a value on IP_mux_sel signal 278 to cause multiplexer 212 to select CRS_ret_addr signal 292 when F-stage 104 specifies the presence of a return instruction via return signal 234 in order to cause microprocessor 100 to branch to the return address previously saved onto CRS 206 in response to a previously executed call instruction, as described below with respect to FIG. 3. Control logic 202 generates a value on IP_mux_sel signal 278 to cause multiplexer 212 to select invalidating_event_addr 295 when an invalidating event, such as a branch misprediction or instruction exception, occurs, but after CRS 206 has been corrected, as described below with respect to FIGS. 6 and 7. In particular, if the invalidating event is a branch instruction misprediction detected in J-stage 114, control logic 202 forwards J_correct_addr 291 on invalidating_event_addr 295; if the invalidating event is a branch instruction misprediction detected in S-stage 126, control logic 202 forwards S_correct_addr 293 on invalidating_event_addr 295; if the invalidating event is an instruction exception detected in S-stage 126, control logic 202 forwards the address of a microcode exception handler routine in a microcode memory of microprocessor 100 for handling the particular exception on invalidating_event_addr 295.

HCCS 216 comprises an array of storage elements, or entries, for storing commands to correct CRS 206. In one embodiment, HCCS 216 comprises six entries for storing six commands. The entries of HCCS 216 are arranged as a stack. The contents of the top entry of HCCS 216 are provided on a top_hccs_cmd signal 297 provided to control logic 202. Control logic 202 generates a true value on a push_HCCS signal 284 to push onto HCCS 216 a command provided on a cmd signal 248 as the input to HCCS 216. When control logic 202 pushes a command onto HCCS 216, the commands currently in HCCS 216 are pushed down one entry (the bottom entry is pushed out), and the command provided on cmd signal 248 is loaded into the top entry of HCCS 216. Control logic 202 also generates a true value on a pop_HCCS signal 286 to pop a command off HCCS 216. When control logic 202 pops a command off HCCS 216, the command in the top entry is discarded and the commands in the other entries of HCCS 216 are all shifted up one entry. HCCS 216 stores commands for correcting CRS 206 in relation to call/return instructions present in stages of pipeline 100 above and including J-stage 114. In contrast, LCCS 224 stores commands for correcting CRS 206 in relation to call/return instructions present in stages of pipeline 100 below J-stage 114. Operation of HCCS 216 and LCCS 224 is described in more detail below.

Control logic 202 stores two commands in HCCS 216. The first command is a POP-to-correct command and the second command is a PUSH-to-correct command. A POP-to-correct command instructs the correction apparatus to pop a return address off CRS 206 to correct for a speculatively executed call instruction that is now being flushed from the pipeline 100. A PUSH-to-correct command instructs the correction apparatus to push a return address onto CRS 206 after popping the return address from RACS 208 in order to correct for a speculatively executed return instruction that is now being flushed from the pipeline 100.

Microprocessor 100 also includes storage elements for storing valid bits 218 associated with each of the entries in HCCS 216. The valid bits 218 are also arranged as a stack corresponding to HCCS 216. A true value in a valid bit 218 indicates the command in the corresponding entry of HCCS 216 is valid, whereas a false value indicates the entry is not valid. Control logic 202 reads and writes the valid bits 218 via valid_bits_HCCS signal 288. In particular, when control logic 202 pushes a command onto HCCS 216, valid bits 218 are also shifted down and a true value is loaded into the top valid bit 218, since the corresponding HCCS 216 entry is now valid because a valid command was pushed down into it. Conversely, when control logic 202 pops a command off HCCS 216, valid bits 218 are also shifted up and a false value is loaded into the bottom valid bit 218. The valid bits 218 are initialized to a false value. Furthermore, valid bits 218 may be individually read and written via valid_bit_HCCS signal 288 to remove, i.e., to invalidate, the bottom valid entry from HCCS 216, as described below.

Multiplexer 222 receives on each of its six inputs one of the six commands in the six HCCS 216 entries. The output of multiplexer 222 is provided as the input to LCCS 224. When J-stage 114 generates a true value on J_call/ret signal 244 and a false value on J_stalled signal 242 to indicate that a call/return instruction is proceeding through J-stage 114, control logic 202 generates an xfer_cmd_mux_sel signal 228 to cause multiplexer 222 to select one of the six inputs to provide to LCCS 224 in order to transfer the bottom valid command of HCCS 216 to LCCS 224, as described below.

LCCS 224 comprises an array of storage elements, or entries, for storing commands to correct CRS 206. In one embodiment, LCCS 224 comprises four entries for storing four commands. The entries of LCCS 224 are arranged as a stack. The contents of the top entry of LCCS 224 are provided on a top_lccs_cmd signal 299 provided to control logic 202. Control logic 202 generates a true value on a push_LCCS signal 294 to push onto LCCS 224 a command provided from multiplexer 222 as the input to LCCS 224. When control logic 202 pushes a command onto LCCS 224, the commands currently in LCCS 224 are pushed down one entry (the bottom entry is pushed out), and the command provided from multiplexer 222 is loaded into the top entry of LCCS 224. Control logic 202 also generates a true value on a pop_LCCS signal 296 to pop a command off LCCS 224. When control logic 202 pops a command off the top LCCS 224, the command in the top entry is discarded and the commands in the other entries of LCCS 224 are all shifted up one entry. LCCS 224 stores commands for correcting CRS 206 in relation to call/return instructions present in stages of pipeline 100 below J-stage 114. In contrast, HCCS 216 stores commands for correcting CRS 206 in relation to call/return instructions present in stages of pipeline 100 above and including J-stage 114. Operation of HCCS 216 and LCCS 224 is described in more detail below. The commands stored in LCCS 224 are the same two commands described above with respect to HCCS 216.

Microprocessor 100 also includes storage elements for storing valid bits 226 associated with each of the entries in LCCS 224. Control logic 202 reads and writes the valid bits 226 via valid_bits_LCCS signal 298. Operation of valid bits 226 is similar to operation of valid bits 218 described above.

Figure 3:
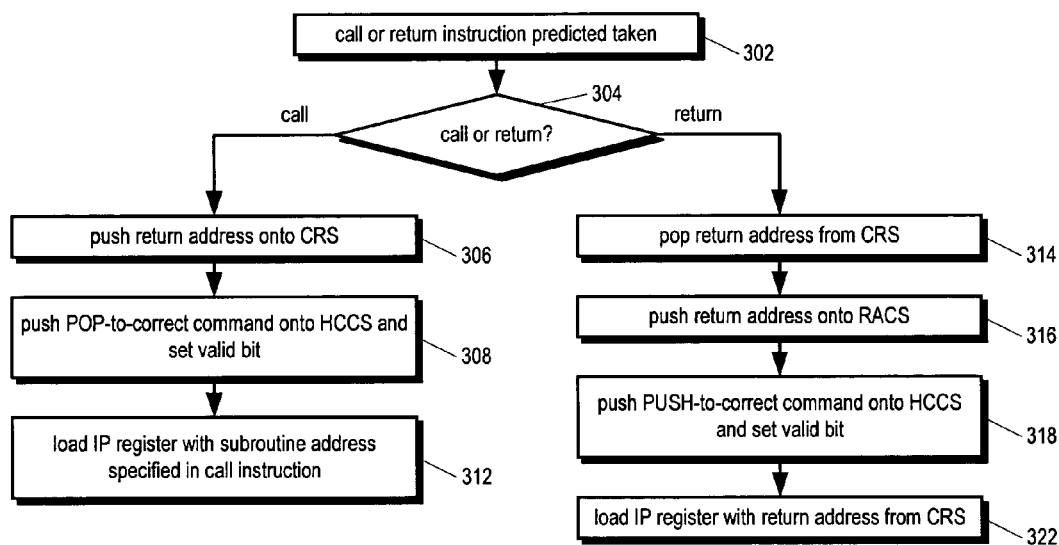
FIGS. 3 through 7 are flowcharts illustrating operation of the call/return stack correction apparatus of FIG. 2 according to the present invention.

Referring now to FIG. 3, a flowchart illustrating operation of the call/return stack correction apparatus of FIG. 2 according to the present invention is shown. In particular, FIG. 3 shows the operation of microprocessor 100 when a call/return instruction is detected by F-stage 104 of FIG. 1. Flow begins at block 302.

At block 302, F-stage 104 detects that a call/return instruction is present and predicts the call/return instruction is taken; consequently F-stage 104 generates a true value on call signal 232 or ret signal 234 depending on whether a call or return instruction was present, respectively. If the instruction is a call, F-stage 104 also generates the call instruction subroutine_addr 236 and return_addr 238. Flow proceeds to decision block 304.

At decision block 304, control logic 202 examines call signal 232 and ret signal 234 to determine whether a call instruction or return instruction was encountered. If a call instruction, flow proceeds to block 306; if a return instruction, flow proceeds to block 314.

At block 306, control logic 202 forwards return_addr 238 on new_return_addr 262, generates a true value on push_CRS signal 266, and generates a value on CRS_mux_sel 264 to select new_return_addr 262 for pushing onto CRS 206, in order to speculatively update CRS 206 in response to the call instruction detected at decision block 304. Flow proceeds to block 308.

At block 308, control logic 202 generates a POP-to-correct command on cmd signal 248 and generates a true value on push_HCCS signal 284 to push the command onto HCCS 216. Consequently, the valid bit 218 is set for the newly pushed command as described above with respect to FIG. 2. Flow proceeds to block 312.

At block 312, control logic 202 generates a true value on IP_load signal 282 and generates a value on IP_mux_sel signal 278 to cause multiplexer 212 to select new_subroutine_addr 276 to cause microprocessor 100 to branch to the call instruction subroutine address. Flow ends at block 312.

At block 314, control logic 202 generates a true value on pop_CRS signal 268 to pop the return address stored in the top entry of CRS 206, which is provided on CRS_ret_addr signal 292, in order to speculatively update CRS 206 in response to the return instruction detected at decision block 304. Flow proceeds to block 316.

At block 316, control logic 202 generates a true value on push_RACS signal 272 to push onto RACS 208 the CRS_ret_addr 292 popped from CRS 206 at block 314. Flow proceeds to block 318.

At block 318, control logic 202 generates a PUSH-to-correct command on cmd signal 248 and generates a true value on push_HCCS signal 284 to push the command onto HCCS 216. Consequently, the valid bit 218 is set for the newly pushed command as described above with respect to FIG. 2. Flow proceeds to block 322.

At block 322, control logic 202 generates a true value on IP_load signal 282 and generates a value on IP_mux_sel signal 278 to cause multiplexer 212 to select CRS_ret_addr 292 to cause microprocessor 100 to branch to the return address popped from CRS 206 at block 314. Flow ends at block 322.

Figure 4:
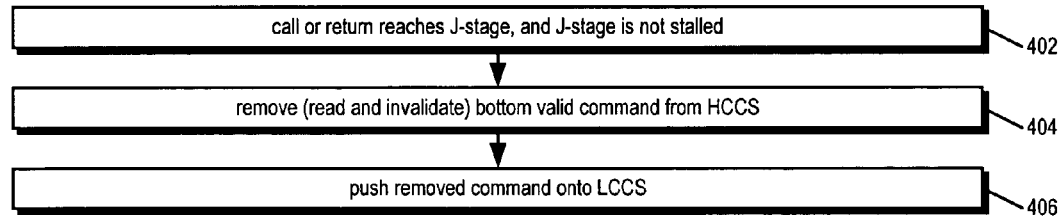

Referring now to FIG. 4, a flowchart illustrating operation of the call/return stack correction apparatus of FIG. 2 according to the present invention is shown. In particular, FIG. 4 shows the operation of microprocessor 100 when a call/return instruction reaches J-stage 114 of FIG. 1. Flow begins at block 402.

At block 402, control logic 202 determines that a call/return instruction has reached J-stage 114 by detecting a true value on J_call/ret signal 244 and that J-stage 114 is not stalled by detecting a false value on J_stalled signal 242. Flow proceeds to block 404.

At block 404, control logic 202 removes the command in the bottom valid entry of HCCS 216. That is, control logic 202 reads valid bits 218 and clears to false the bottom valid bit 218 having a true value to invalidate the bottom valid command of HCCS 216 since the command is being transferred to LCCS 224. Flow proceeds to block 406.

At block 406, control logic 202 generates a true value on push_LCCS signal 294 and generates a value on xfer_cmd_mux_sel signal 228 to select the command from the HCCS 216 entry that was removed at block 404, in order to push the removed command onto LCCS 224. Flow ends at block 406.

Figure 5:
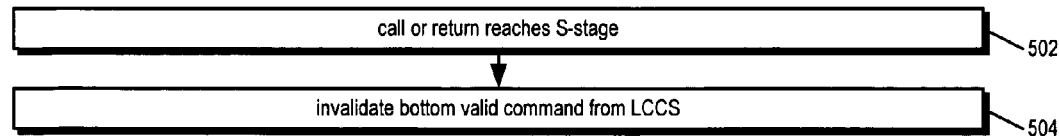

Referring now to FIG. 5, a flowchart illustrating operation of the call/return stack correction apparatus of FIG. 2 according to the present invention is shown. In particular, FIG. 5 shows the operation of microprocessor 100 when a call/return instruction reaches S-stage 126 of FIG. 1, i.e., once a call/return instruction is no longer speculative. Flow begins at block 502.

At block 502, control logic 202 determines that a call/return instruction has reached S-stage 126 by detecting a true value on S_call/ret signal 252. Flow proceeds to block 504.

At block 504, control logic 202 removes the command in the bottom valid entry of LCCS 224. That is, control logic 202 reads valid bits 226 and clears to false the bottom valid bit 226 having a true value to invalidate the bottom valid command of LCCS 224 since the call/return instruction is no longer speculative; hence, CRS 206 should not be updated with respect to the call/return instruction in S-stage 126 if an invalidating event occurs. Flow ends at block 504.

Figure 6:
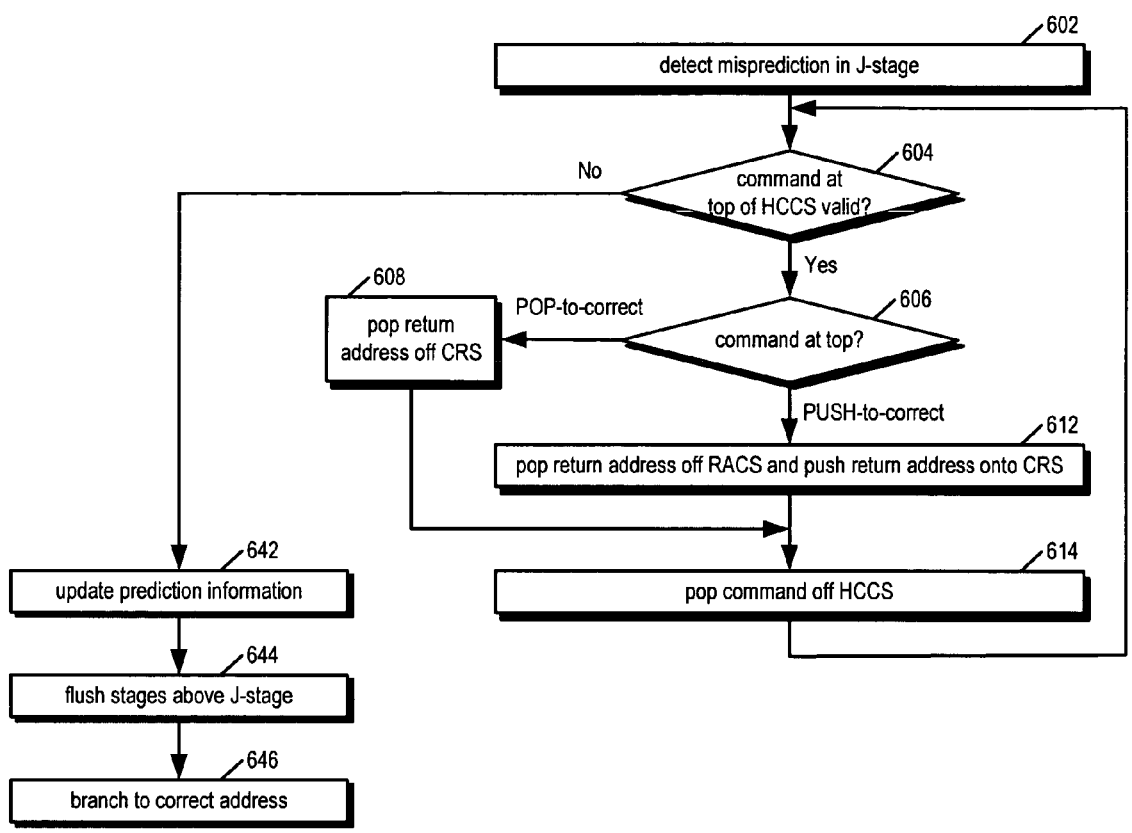

Referring now to FIG. 6, a flowchart illustrating operation of the call/return stack correction apparatus of FIG. 2 according to the present invention is shown. In particular, FIG. 6 shows the operation of microprocessor 100 when a branch instruction misprediction is detected at J-stage 114. Flow begins at block 602.

At block 602, control logic 202 determines that J-stage 114 has detected a branch instruction misprediction by examining J_mispredict signal 246. Flow proceeds to decision block 604.

At decision block 604, control logic 202 reads the valid bit 218 associated with the top HCCS 216 entry to determine whether the command stored therein is valid. If not, flow proceeds to block 642; otherwise, flow proceeds to decision block 606.

At decision block 606, control logic 202 examines the command at the top of HCCS 216 via top_hccs_cmd signal 297 to determine the type of command. If the command is a PUSH-to-correct command, then flow proceeds to block 612; if the command is a POP-to-correct command, then flow proceeds to block 608.

At block 608, control logic 202 generates a true value on pop_CRS signal 268 to pop the top return address off CRS 206 in order to correct for the incorrect speculative push of the return address onto CRS 206 in response to a call instruction in one of the stages above or including J-stage 114 that will be flushed from the pipeline 100 as a result of the branch instruction detected mispredicted in J-stage 114. Flow proceeds to block 614.

At block 612, control logic 202 generates a true value on pop_RACS signal 274 to pop the top return address off RACS 208, which is provided on RACS_ret_addr signal 258. Additionally, control logic 202 generates a true value on push_CRS signal 266 to push the RACS_ret_addr 258 onto CRS 206 in order to correct for the incorrect speculative pop of the return address off CRS 206 in response to a return instruction in one of the stages above or including J-stage 114 that will be flushed from the pipeline 100 as a result of the branch instruction detected mispredicted in J-stage 114. Flow proceeds to block 614.

At block 614, control logic 202 generates a true value on pop_HCCS signal 286 to pop the top command off HCCS 216 since CRS 206 has now been corrected with respect to the speculatively executed call/return instruction. Flow returns to decision block 604 to determine whether another valid command is present in HCCS 216.

At block 642, microprocessor 100 updates the prediction information that caused the branch misprediction to occur. For example, if the branch misprediction was made by the branch target address cache in I-stage 102, then the mispredicting entry of the branch target address cache is invalidated so that the next time the fetch address referencing the branch instruction is applied to the branch target address cache, the branch target address cache will generate a miss, which has the effect of predicting the branch instruction is not taken, which causes flow to proceed to the next sequential instruction rather than to the target instruction of the branch. Flow proceeds to block 644.

At block 644, microprocessor 100 flushes the instructions present in the upper pipeline stages, i.e., the stages above and including J-stage 114. In one embodiment, flushing the instructions comprises setting a valid bit to false for each instruction in its corresponding pipeline stage. Flow proceeds to block 646.

At block 646, control logic 202 generates a true value on IP_load signal 282 and generates a value on IP_mux_sel signal 278 to cause multiplexer 212 to select invalidating_event_addr 295 to cause microprocessor 100 to branch to the correct target of the branch instruction forwarded by control logic 202 from J_correct_addr signal 291. Flow ends at block 646.

Figure 7:
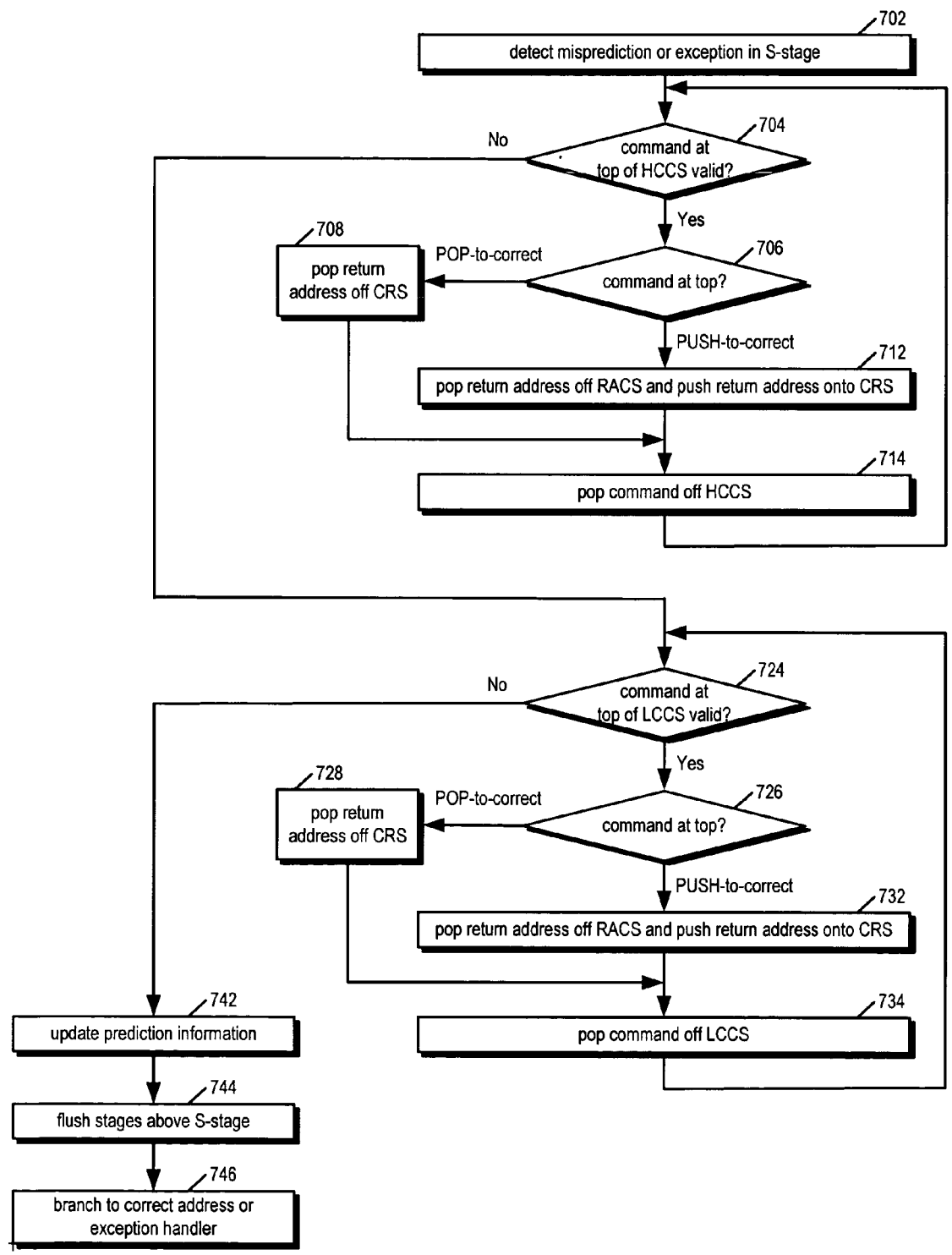

Referring now to FIG. 7, a flowchart illustrating operation of the call/return stack correction apparatus of FIG. 2 according to the present invention is shown. In particular, FIG. 7 shows the operation of microprocessor 100 when a branch instruction misprediction is detected at S-stage 126. Flow begins at block 702.

At block 702, control logic 202 determines that S-stage 126 has detected a branch instruction misprediction by examining S_mispredict signal 254 or that S-stage 126 has detected an exception by examining S_exception signal 256. Flow proceeds to decision block 704.

Blocks 704 through 714 of FIG. 7 are similar to block 604 through 614 of FIG. 6; consequently they will not be described for the sake of brevity. However, unlike FIG. 6, flow proceeds from decision block 704 to decision block 724 if the command at the top of HCCS 216 is not valid.

At decision block 724, control logic 202 reads the valid bit 226 associated with the top LCCS 224 entry to determine whether the command stored therein is valid. If not, flow proceeds to block 742; otherwise, flow proceeds to decision block 726.

At decision block 726, control logic 202 examines the command at the top of LCCS 224 via top_lccs_cmd signal 299 to determine the type of command. If the command is a PUSH-to-correct command, then flow proceeds to block 732; if the command is a POP-to-correct command, then flow proceeds to block 728.

At block 728, control logic 202 generates a true value on pop_CRS signal 268 to pop the top return address off CRS 206 in order to correct for the incorrect speculative push of the return address onto CRS 206 in response to a call instruction in one of the stages below J-stage 114 that will be flushed from the pipeline 100 as a result of the branch instruction detected mispredicted in S-stage 126 or exception detected in S-stage 126. Flow proceeds to block 734.

At block 732, control logic 202 generates a true value on pop_RACS signal 274 to pop the top return address off RACS 208, which is provided on RACS_ret_addr signal 258. Additionally, control logic 202 generates a true value on push_CRS signal 266 to push the RACS_ret_addr 258 onto CRS 206 in order to correct for the incorrect speculative pop of the return address off CRS 206 in response to a return instruction in one of the stages below J-stage 114 that will be flushed from the pipeline 100 as a result of the branch instruction detected mispredicted in S-stage 126 or exception detected in S-stage 126. Flow proceeds to block 734.

At block 734, control logic 202 generates a true value on pop_LCCS signal 296 to pop the top command off LCCS 224 since CRS 206 has now been corrected with respect to the speculatively executed call/return instruction. Flow returns to decision block 734 to determine whether another valid command is present in LCCS 224.

At block 742, microprocessor 100 updates the prediction information that caused the branch misprediction to occur. If the steps of FIG. 7 are performed because an exception was detected in S-stage 126 at block 702, then no action is taken at block 742. Flow proceeds to block 744.

At block 744, microprocessor 100 flushes the instructions present in the pipeline stages above and including S-stage 126. Flow proceeds to block 746.

At block 746, control logic 202 generates a true value on IP_load signal 282 and generates a value on IP_mux_sel signal 278 to cause multiplexer 212 to select invalidating_event_addr 295 to cause microprocessor 100 to branch to the address of the correct target of the branch instruction forwarded by control logic 202 from J_correct_addr signal 291 or S_correct_addr signal 293 in the case of a branch misprediction, or to the microcode exception handler routine to handle the exception condition in the case of an exception. Flow ends at block 746.

Although the present invention and its objects, features and advantages have been described in detail, other embodiments are encompassed by the invention. For example, although two types of events are described that require a microprocessor to correct updates previously made to a call/return stack based on speculative executions of call/return instructions, namely branch mispredictions and exceptions, the present invention is not limited to these two types of events; rather, a microprocessor may employ the call/return stack correction apparatus to correct a call/return stack in response to other types of events. Additionally, although the present invention has been described in the context of x86 architecture microprocessor CALL and RET instructions, the invention may be employed in any processor that includes call and return instructions in its instruction set. Furthermore, although embodiments have been described with a particular number of entries in the various correction stacks, the size of the stacks may vary according to the number of stages in the various segments of the processor pipeline.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus for correcting a call/return stack in a pipelined microprocessor, the apparatus comprising:
    a first stack, comprising a first plurality of entries for storing correction information related to call or return instructions present in a first plurality of stages of the microprocessor pipeline;
    a second stack, coupled to said first stack, comprising a second plurality of entries for storing correction information related to call or return instructions present in a second plurality of stages of the microprocessor pipeline;
    control logic, coupled to said first and second stacks, for receiving a first control signal indicating a call or return instruction is passing from said first plurality of stages to said second plurality of stages, wherein said control logic moves said correction information associated with said call or return instruction from said first stack to said second stack in response to said first control signal;
    a second control signal, received by said control logic, for indicating said call or return instructions present in said first plurality of pipeline stages were speculatively incorrectly executed, wherein said control logic corrects the call/return stack using said correction information stored in said first plurality of entries of said first stack, in response to said second control signal; and
    a third control signal, received by said control logic, for indicating said call or return instructions present in said first and second plurality of pipeline stages were speculatively incorrectly executed, wherein said third control signal indicates an instruction preceding said call or return instructions present in said first and second plurality of pipeline stages generated a microprocessor exception.

2. The apparatus of claim 1, wherein said control logic moving said correction information associated with said call or return instruction from said first stack to said second stack comprises said control logic removing said correction information from a bottom valid one of said first plurality of entries in said first stack and pushing said removed correction information onto said second stack.

3. The apparatus of claim 2, wherein said control logic removing said correction information from said bottom valid one of said first plurality of entries in said first stack comprises invalidating said bottom valid one of said first plurality of entries in said first stack.

4. The apparatus of claim 1, wherein if said related call or return instruction is a call instruction, said correction information comprises a command to pop a return address off the call/return stack.

5. The apparatus of claim 1, further comprising:
    a third stack, coupled to said control logic, comprising a third plurality of entries for storing return addresses related to call instructions present in said first or second plurality of pipeline stages.

6. The apparatus of claim 5, wherein if said related call or return instruction is a return instruction, said correction information comprises a command to pop a return address off said third stack and push said return address onto the internal call/return stack.

7. The apparatus of claim 1, further comprising:
    a plurality of valid bits, coupled to said first stack, for specifying whether corresponding ones of said first plurality of entries are valid.

8. The apparatus of claim 1, further comprising:
    a plurality of valid bits, coupled to said second stack, for specifying whether corresponding ones of said second plurality of entries are valid.

9. The apparatus of claim 1, wherein said first control signal indicates said call or return instruction has reached a bottom stage of said first plurality of pipeline stages.

10. The apparatus of claim 9, wherein said first control signal indicates said bottom stage of said first plurality of pipeline stages is not stalled.

11. The apparatus of claim 10, wherein said first control signal indicates a branch instruction preceding said call or return instruction has not been detected as mispredicted by the microprocessor.

12. The apparatus of claim 1, wherein said second control signal indicates a branch instruction preceding said call or return instructions present in said first plurality of pipeline stages was mispredicted by the microprocessor.

13. The apparatus of claim 1, wherein said second control signal indicates one of said call or return instructions present in said first plurality of pipeline stages was mispredicted by the microprocessor.

14. The apparatus of claim 1, wherein said second control signal is generated during a clock cycle in which said call or return instructions are being processed by a bottom stage of said first plurality of pipeline stages.

15. The apparatus of claim 1, wherein for each valid one of said first plurality of entries, said control logic pops a top said valid one of said first plurality of entries from said first stack, and corrects the call/return stack based on said correction information stored therein.

16. The apparatus of claim 1, wherein said third control signal indicates a branch instruction preceding said call or return instructions present in said first and second plurality of pipeline stages was mispredicted by the microprocessor.

17. The apparatus of claim 1, wherein said third control signal indicates one of said call or return instructions present in said first and second plurality of pipeline stages was mispredicted by the microprocessor.

18. The apparatus of claim 1, wherein said third control signal is generated during a clock cycle in which said call or return instructions are being processed by a bottom stage of said second plurality of pipeline stages.

19. The apparatus of claim 1, wherein said control logic corrects the call/return stack using said correction information stored in said first and second plurality of entries of said first and second stacks, in response to said third control signal.

20. The apparatus of claim 19, wherein for each valid one of said first plurality of entries, said control logic pops a top said valid one of said first plurality of entries from said first stack, and corrects the call/return stack based on said correction information stored therein, then for each valid one of said second plurality of entries, said control logic pops a top said valid one of said second plurality of entries from said second stack.

21. The apparatus of claim 1, further comprising:
a second signal, received by said control logic, for indicating one of said call or return instructions present in said second plurality of stages of the microprocessor pipeline is no longer speculative, wherein said control logic updates said second stack in response to said second signal.

22. The apparatus of claim 21, wherein said control logic updating said second stack in response to said second signal comprises invalidating one of said second plurality of entries storing said correction information for said no longer speculative one of said call or return instructions.

23. The apparatus of claim 22, wherein said invalidating one of said second plurality of entries storing said correction information for said no longer speculative one of said call or return instructions comprises invalidating a bottom valid one of said second plurality of entries.

24. The apparatus of claim 1, farther comprising:
a second signal, received by said control logic, for requesting the call/return stack be updated in response to the presence of one of said call or return instructions in said first plurality of pipeline stages, wherein said control logic stores correction information related to said one of said call or return instructions into said first stack in response to said second signal.

25. The apparatus of claim 24, wherein said control logic storing said correction information related to said one of said call or return instructions into said first stack comprises said control logic pushing said correction information onto said first stack.

26. A method for maintaining consistency between a call/return stack (CRS) in a pipelined microprocessor and a memory coupled thereto, the method comprising:
receiving requests to update the CRS in response to a presence of call or return instructions;
storing correction information into a first buffer, in response to said receiving;
detecting a condition in which one of the call or return instructions has proceeded past a first stage of the microprocessor pipeline configured to detect an invalidating event, after said storing;
moving a portion of the correction information from the first buffer to a second buffer, in response to said detecting, wherein said invalidating event comprises an exception;
correcting the CRS with the correction information stored in the first buffer if the first stage detects the invalidating event; and
correcting the CRS with the correction information stored in the first and second buffer if a second stage of the microprocessor pipeline detects a second invalidating event, wherein the second stage is below the first stage.

27. A computer program product for use with a computing device, the computer program product comprising:
a computer usable storage medium, having computer-readable program code embodied in said medium, for providing an apparatus for correcting a call/return stack in a pipelined microprocessor, said program code comprising:
first program code for providing a first stack, comprising a first plurality of entries for storing correction information related to call or return instructions present in a first plurality of stages of the microprocessor pipeline;
second program code for providing a second stack, coupled to said first stack, comprising a second plurality of entries for storing correction information related to call or return instructions present in a second plurality of stages of the microprocessor pipeline;
third program code for providing control logic, coupled to said first and second stacks, for receiving a first control signal indicating a call or return instruction is passing from said first plurality of stages to said second plurality of stages, wherein said control logic moves said correction information associated with said call or return instruction from said first stack to said second stack in response to said first control signal;
fourth program code for providing a second control signal, received by said control logic, for indicating said call or return instructions present in said first plurality of pipeline stages were speculatively incorrectly executed, wherein said control logic corrects the call/return stack using said correction information stored in said first plurality of entries of said first stack, in response to said second control signal; and fifth program code for providing a third control signal, received by said control logic, for indicating said call or return instructions present in said first and second plurality of pipeline stages were speculatively incorrectly executed, wherein said third control signal indicates an instruction preceding said call or return instructions present in said first and second plurality of pipeline stages generated a microprocessor exception.

28. The computer program product of claim 27, wherein said control logic moving said correction information associated with said call or return instruction from said first stack to said second stack comprises said control logic removing said correction information from a bottom valid one of said first plurality of entries in said first stack and pushing said removed correction information onto said second stack.

29. The computer program product of claim 28, wherein said control logic removing said correction information from said bottom valid one of said first plurality of entries in said first stack comprises invalidating said bottom valid one of said first plurality of entries in said first stack.

30. The computer program product of claim 27, wherein if said related call or return instruction is a call instruction, said correction information comprises a command to pop a return address off the call/return stack.

31. The computer program product of claim 27, further comprising:

sixth program code for providing a third stack, coupled to said control logic, comprising a third plurality of entries for storing return addresses related to call instructions present in said first or second plurality of pipeline stages.

32. The computer program product of claim 31, wherein if said related call or return instruction is a return instruction, said correction information comprises a command to pop a return address off said third stack and push said return address onto the internal call/return stack.

33. The computer program product of claim 27, further comprising:

sixth program code for providing a plurality of valid bits, coupled to said first stack, for specifying whether corresponding ones of said first plurality of entries are valid.

34. The computer program product of claim 27, further comprising:

sixth program code for providing a plurality of valid bits, coupled to said second stack, for specifying whether corresponding ones of said second plurality of entries are valid.

35. The computer program product of claim 27, wherein said first control signal indicates said call or return instruction has reached a bottom stage of said first plurality of pipeline stages.

36. The computer program product of claim 35, wherein said first control signal indicates said bottom stage of said first plurality of pipeline stages is not stalled.

37. The computer program product of claim 36, wherein said first control signal indicates a branch instruction preceding said call or return instruction has not been detected as mispredicted by the microprocessor.

38. The computer program product of claim 27, wherein said second control signal indicates a branch instruction preceding said call or return instructions present in said first plurality of pipeline stages was mispredicted by the microprocessor.

39. The computer program product of claim 27, wherein said second control signal indicates one of said call or return instructions present in said first plurality of pipeline stages was mispredicted by the microprocessor.

40. The computer program product of claim 27, wherein said second control signal is generated during a clock cycle in which said call or return instructions are being processed by a bottom stage of said first plurality of pipeline stages.

41. The computer program product of claim 27, wherein for each valid one of said first plurality of entries, said control logic pops a top said valid one of said first plurality of entries from said first stack, and corrects the call/return stack based on said correction information stored therein.

42. The computer program product of claim 27, wherein said third control signal indicates a branch instruction preceding said call or return instructions present in said first and second plurality of pipeline stages was mispredicted by the microprocessor.

43. The computer program product of claim 27, wherein said third control signal indicates one of said call or return instructions present in said first and second plurality of pipeline stages was mispredicted by the microprocessor.

44. The computer program product of claim 27, wherein said third control signal is generated during a clock cycle in which said call or return instructions are being processed by a bottom stage of said second plurality of pipeline stages.

45. The computer program product of claim 27, wherein said control logic corrects the call/return stack using said correction information stored in said first and second plurality of entries of said first and second stacks, in response to said third control signal.

46. The computer program product of claim 45, wherein for each valid one of said first plurality of entries, said control logic pops a top said valid one of said first plurality of entries from said first stack, and corrects the call/return stack based on said correction information stored therein, then for each valid one of said second plurality of entries, said control logic pops a top said valid one of said second plurality of entries from said second stack.

47. The computer program product of claim 27, further comprising:

sixth program code for providing a second signal, received by said control logic, for indicating one of said call or return instructions present in said second plurality of stages of the microprocessor pipeline is no longer speculative, wherein said control logic updates said second stack in response to said second signal.

48. The computer program product of claim 47, wherein said control logic updating said second stack in response to said second signal comprises invalidating one of said second plurality of entries storing said correction information for said no longer speculative one of said call or return instructions.

49. The computer program product of claim 48, wherein said invalidating one of said second plurality of entries storing said correction information for said no longer speculative one of said call or return instructions comprises invalidating a bottom valid one of said second plurality of entries.

50. The computer program product of claim 27, further comprising:

sixth program code for providing a second signal, received by said control logic, for requesting the call/return stack be updated in response to the presence of one of said call or return instructions in said first plurality of pipeline stages, wherein said control logic stores correction information related to said one of said call or return instructions into said first stack in response to said second signal.

51. The computer program product of claim 50, wherein said control logic storing said correction information related to said one of said call or return instructions into said first stack comprises said control logic pushing said correction information onto said first stack.

52. An apparatus for correcting a call/return stack in a pipelined microprocessor, the apparatus comprising:
a first stack, comprising a first plurality of entries for storing correction information related to call or return instructions present in a first plurality of stages of the microprocessor pipeline;
a second stack, coupled to said first stack, comprising a second plurality of entries for storing correction information related to call or return instructions present in a second plurality of stages of the microprocessor pipeline;
control logic, coupled to said first and second stacks, for receiving a first control signal indicating a call or return instruction is passing from said first plurality of stages to said second plurality of stages, wherein said control logic moves said correction information associated with said call or return instruction from said first stack to said second stack in response to said first control signal;
a second control signal, received by said control logic, for indicating said call or return instructions present in said first plurality of pipeline stages were speculatively incorrectly executed, wherein said control logic corrects the call/return stack using said correction information stored in said first plurality of entries of said first stack, in response to said second control signal; and
a third control signal, received by said control logic, for indicating said call or return instructions present in said first and second plurality of pipeline stages were speculatively incorrectly executed, wherein said control logic corrects the call/return stack using said correction information stored in said first and second plurality of entries of said first and second stacks, in response to said third control signal, wherein for each valid one of said first plurality of entries, said control logic pops a top said valid one of said first plurality of entries from said first stack, and corrects the call/return stack based on said correction information stored therein, then for each valid one of said second plurality of entries, said control logic pops a top said valid one of said second plurality of entries from said second stack.

53. The apparatus of claim 52, wherein said control logic moving said correction information associated with said call or return instruction from said first stack to said second stack comprises said control logic removing said correction information from a bottom valid one of said first plurality of entries in said first stack and pushing said removed correction information onto said second stack.

54. The apparatus of claim 53, wherein said control logic removing said correction information from said bottom valid one of said first plurality of entries in said first stack comprises invalidating said bottom valid one of said first plurality of entries in said first stack.

55. The apparatus of claim 52, wherein if said related call or return instruction is a call instruction, said correction information comprises a command to pop a return address off the call/return stack.

56. The apparatus of claim 52, further comprising:
a third stack, coupled to said control logic, comprising a third plurality of entries for storing return addresses related to call instructions present in said first or second plurality of pipeline stages.

57. The apparatus of claim 56, wherein if said related call or return instruction is a return instruction, said correction information comprises a command to pop a return address off said third stack and push said return address onto the internal call/return stack.

58. The apparatus of claim 52, further comprising:
a plurality of valid bits, coupled to said first stack, for specifying whether corresponding ones of said first plurality of entries are valid.

59. The apparatus of claim 52, further comprising:
a plurality of valid bits, coupled to said second stack, for specifying whether corresponding ones of said second plurality of entries are valid.

60. The apparatus of claim 52, wherein said first control signal indicates said call or return instruction has reached a bottom stage of said first plurality of pipeline stages.

61. The apparatus of claim 60, wherein said first control signal indicates said bottom stage of said first plurality of pipeline stages is not stalled.

62. The apparatus of claim 61, wherein said first control signal indicates a branch instruction preceding said call or return instruction has not been detected as mispredicted by the microprocessor.

63. The apparatus of claim 52, wherein said second control signal indicates a branch instruction preceding said call or return instructions present in said first plurality of pipeline stages was mispredicted by the microprocessor.

64. The apparatus of claim 52, wherein said second control signal indicates one of said call or return instructions present in said first plurality of pipeline stages was mispredicted by the microprocessor.

65. The apparatus of claim 52, wherein said second control signal is generated during a clock cycle in which said call or return instructions are being processed by a bottom stage of said first plurality of pipeline stages.

66. The apparatus of claim 52, wherein for each valid one of said first plurality of entries, said control logic pops a top said valid one of said first plurality of entries from said first stack, and corrects the call/return stack based on said correction information stored therein.

67. The apparatus of claim 52, wherein said third control signal indicates a branch instruction preceding said call or return instructions present in said first and second plurality of pipeline stages was mispredicted by the microprocessor.

68. The apparatus of claim 52, wherein said third control signal indicates an instruction preceding said call or return instructions present in said first and second plurality of pipeline stages generated a microprocessor exception.

69. The apparatus of claim 52, wherein said third control signal indicates one of said call or return instructions present in said first and second plurality of pipeline stages was mispredicted by the microprocessor.

70. The apparatus of claim 52, wherein said third control signal is generated during a clock cycle in which said call or return instructions are being processed by a bottom stage of said second plurality of pipeline stages.

71. The apparatus of claim 52, further comprising:
a second signal, received by said control logic, for indicating one of said call or return instructions present in said second plurality of stages of the microprocessor pipeline is no longer speculative, wherein said control logic updates said second stack in response to said second signal.

72. The apparatus of claim 71, wherein said control logic updating said second stack in response to said second signal comprises invalidating one of said second plurality of entries storing said correction information for said no longer speculative one of said call or return instructions.

73. The apparatus of claim 72, wherein said invalidating one of said second plurality of entries storing said correction information for said no longer speculative one of said call or return instructions comprises invalidating a bottom valid one of said second plurality of entries.

74. The apparatus of claim 52, further comprising:
a second signal, received by said control logic, for requesting the call/return stack be updated in response to the presence of one of said call or return instructions in said first plurality of pipeline stages, wherein said control logic stores correction information related to said one of said call or return instructions into said first stack in response to said second signal.

75. The apparatus of claim 74, wherein said control logic storing said correction information related to said one of said call or return instructions into said first stack comprises said control logic pushing said correction information onto said first stack.

* * * * *